(12) United States Patent
Russell et al.

(10) Patent No.: US 6,220,673 B1
(45) Date of Patent: Apr. 24, 2001

(54) LASER JOINING TOOTHBRUSH HEADS TO HANDLES

(75) Inventors: Bruce M. Russell, Howell, NJ (US); Robert A. Grimm, Columbus, OH (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 09/351,571

(22) Filed: Jul. 12, 1999

(51) Int. Cl.[7] .......................................................... A46D 3/00
(52) U.S. Cl. ............................................ 300/21; 156/272.8
(58) Field of Search ............................ 300/21; 156/272.2, 156/272.8

(56) References Cited

U.S. PATENT DOCUMENTS 3,769,117 * 10/1973 Bowen ............................... 156/272.8
4,441,227 * 4/1984 D'Ar Gembeau .
4,762,373 * 8/1988 Amos .

* cited by examiner

*Primary Examiner*—Randall E. Chin
(74) *Attorney, Agent, or Firm*—Henry S. Goldfine

(57) ABSTRACT

The present invention relates to a method of welding preformed toothbrush heads and handles using about 0.7 to about 2.0 micrometers, or about 4.0 to about 6.0 micrometers, wavelength laser beam.

22 Claims, 1 Drawing Sheet

US 6,220,673 B1

LASER JOINING TOOTHBRUSH HEADS TO HANDLES

FIELD OF THE INVENTION

The present invention relates to toothbrushes and in particular a method of manufacture of toothbrush bodies, wherein pre-formed toothbrush heads and handles are joined together to form complete toothbrush bodies.

BACKGROUND OF THE INVENTION

Conventional toothbrush bodies comprise an elongated rod that functions as a handle, joined to a neck, which may be generally straight or curved, which is connected to a head having a flattened section to which tufts of bristles are fastened. Such toothbrush bodies are typically manufactured in one step by injection molding; wherein, a molten thermoplastic material is injected under high pressure into a steel mold. After the plastic solidifies, the mold is opened and the fully formed toothbrush body is removed. Such a conventional toothbrush body, formed of one material, lacks the desired different coloration and physical characteristics possible with toothbrush bodies having heads and bodies manufactured of different materials. For example, it is desirable to have a rigid handle for manipulating the toothbrush with a more flexible, i.e. less rigid, head that will flex and so tend to reduce the gingival trauma associated with excess brushing pressure by the user.

U.S. Pat. No. 2,445,657, discloses toothbrush bodies having heads of a resilient material, such as vulcanized rubber, secured to rigid handles. These toothbrush bodies are manufactured in a multi-step process, wherein the heads and handles are separately produced and subsequently cemented together. Such cementing, or in general adhesive bonding, takes significant surface preparation to provide an adequate/strong seal and takes a significant time interval for the adhesive to cure or otherwise set, adversely effecting the economics of mass production.

U.S. Pat. No. 5,121,520, discloses a toothbrush having twin side-by-side brushing heads attached to the toothbrush handle at a predetermined angle. The heads may be joined to the handle by gluing, i.e. adhesive bonding, or fusion, i.e. heating the head/handle joint surfaces to a softened thermoplastic state, bringing them into intimate contact and maintaining that contact to form a joining upon cooling. Fusion, unlike gluing, requires no surface preparation and no long set-up time; however, with fusion unless there is precise heating of both the head/handle joint surfaces, it is possible to experience degradation of the plastic toothbrush material, excessive softening and distortion of the plastic, as well as, excessive flash.

There is a need in the toothbrush manufacturing art for a means of bonding pre-formed toothbrush heads to handles of different materials, having different physical properties and/or coloration, in a time interval acceptable for mass production thereof and without any degradation, distortion, excessive flash, or other consumer unacceptable effect.

SUMMARY OF THE INVENTION

The present invention encompasses a method of joining preformed toothbrush head and handle components using laser beams of two particular wavelength ranges; wherein, these laser beams penetrate typical thermoplastic toothbrush material to heat the internal joint, to weld the part of the joint together, without significant absorption or heating of the material being penetrated.

The transmission, without absorption, of such particular wavelength ranges of laser light through typical toothbrush thermoplastic materials of construction, hereinafter "window effect", is essential for the internal welding of toothbrush components of the present invention. This window effect can be demonstrated by the spectra of each such particular thermoplastic. The spectra of each thermoplastic is the measurement of the transmission ability of a range of wavelengths, such as the wavelenghts of particular lasers, through the thermoplastic. The *Atlas of Polymer and Plastic Analysis, Vol. 1, Polymers: Structures and Spectra, 2nd Edition,* by Dieter O. Hummel, published by Carl Hanser Verlag, Germany, 1982, (hereinafter the *Atlas*) contains such spectra; for polymers in a wavelength range from the bottom of the infrared, 2.5 micrometers, into the microwave range, 50 micrometers. As shown in the *Atlas,* the major bands of transmission through and absorption for typical polypropylene and polyethylene terephthalate toothbrush thermoplastics are shown in Table 1, below.

TABLE 1

Transmission Through/Absorption Wavelengths of Polypropylene And Polyethylene Terephthalate

| Material | Transmission Through Bands (micrometers) | Absorption Bands (micrometers) | Applicable Lasers with Wavelength (micrometers) |
|---|---|---|---|
| Polypropylene[1] | 2.5 to 3.22 | | N/A |
| | | 3.22 to 4.0 | N/A |
| | 4.0 to 6.45 | | CO, 5 to 6 |
| | | 6.45 and up | $CO_2$, 10.6 |
| Polyethylene terephthalate[2] | 2.5 to 3.125 | | N/A |
| | | 3.125 to 3.6 | N/A |
| | 3.6 to 6.0 | | CO, 5 to 6 |
| | | 5 and up | $CO_2$, 10.6 |

Notes: 1. Atlas, pages 6, Spectra 16, for poly(propylene), isotactic.
2. Atlas, page 232, Spectra 694.

For comparison, also shown in Table 1 are lasers which have wavelengths within the particular spectra ranges which either transmit or absorb energy within the wavelength ranges shown in Table 1. Accordingly, in accordance to the present invention, from the data shown in Table 1, a CO laser will transmit energy through such thermoplastics to an internal weld therein, while a $CO_2$ laser will not.

The particular two wavelength ranges unexpectedly found to provide this "window effect", encompasses from about 0.7 to about 2.0 micrometers within the near-infrared, and from about 4.0 to about 6.0 micrometers within the infrared (IR) spectrum The method comprises selecting a first thermoplastic toothbrush component free of any material, such as a pigment or dye, capable of absorbing window effect wavelengths and selecting the other thermoplastic toothbrush component containing a material, such as a pigment or dye, capable of absorbing such about 0.7 to about 2.0 or about 4.0 to about 6.0 micrometer wavelength laser energy; aligning the two components in an tightly abutting relationship to form a joint; exposing the joint to a laser generating such a wavelength beam by penetrating the first thermoplastic component; thereby melting a surface layer of the component containing the laser absorbing material at the joint; with concurrent melting of the abutting surface layer of the first component, such that a weld is formed between the two components as the melted surface layers cool.

In an alternative embodiment of the method of the present invention, both the abutting toothbrush head and handle components are free of any material capable of absorbing from about 0.7 to about 2.0 micrometers or from about 4.0 to about 6.0 micrometers wavelength laser energy. In this embodiment, it has surprisingly been found that these components can be bonded together when briefly exposed to a laser beam having a wavelength of from about 0.7 to about 2.0 micrometers, or from about 4.0 to about 6.0 micrometers, when a relatively minute amount of such wavelength absorbing material is spread across the abutting surface of one of the components prior to exposure to such a laser beam. The use of such a relatively minute amount of such wavelength absorbing material provides a joint between the components wherein the particular wavelength absorbing material is not readily consumer noticeable.

DETAILED DESCRIPTION OF THE INVENTION

Figure 1:
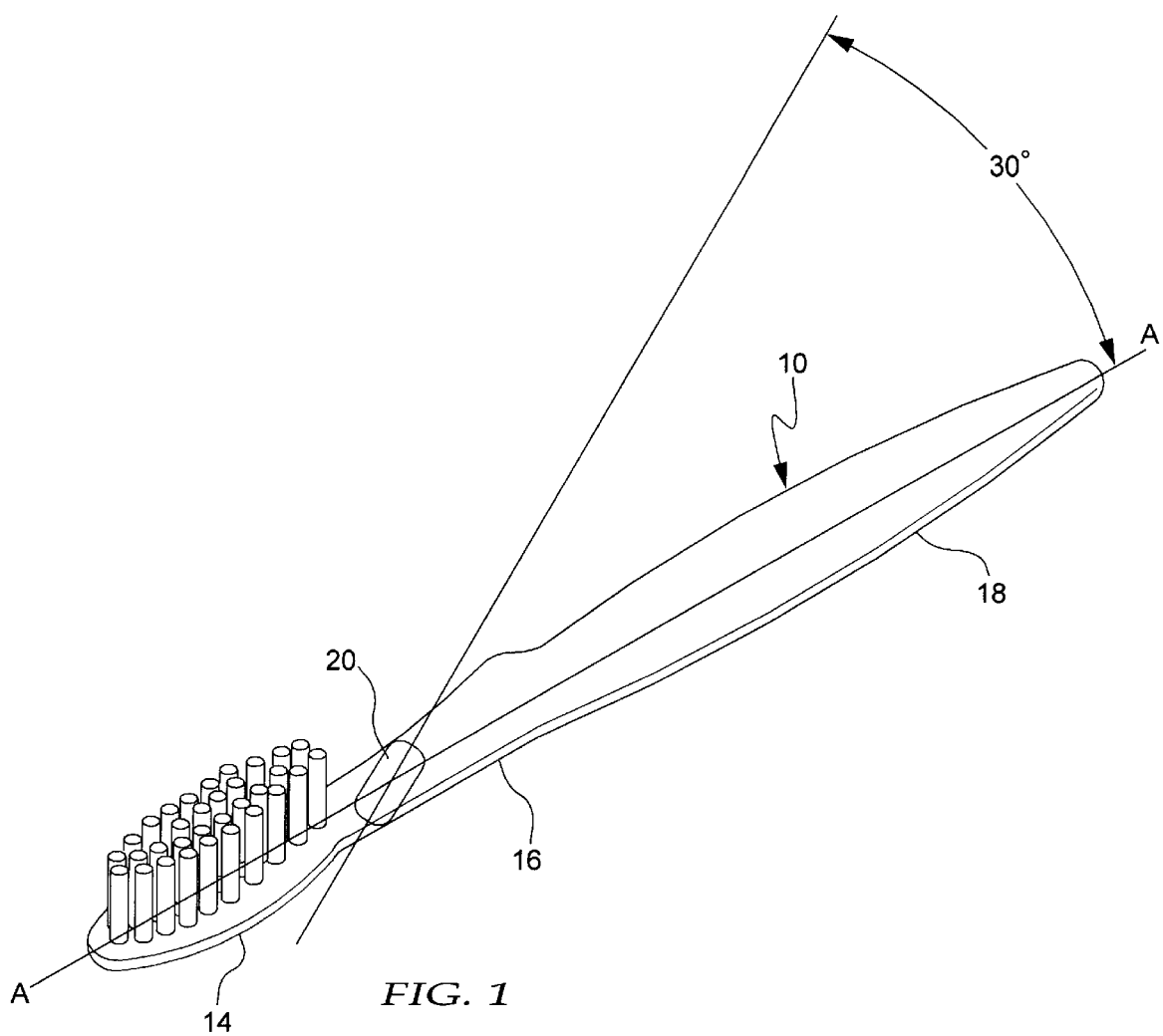
FIG. 1 is a longitudinal perspective view, showing a toothbrush of the present invention about a longitudinal axis, A—A, thereof.
Figure 2:
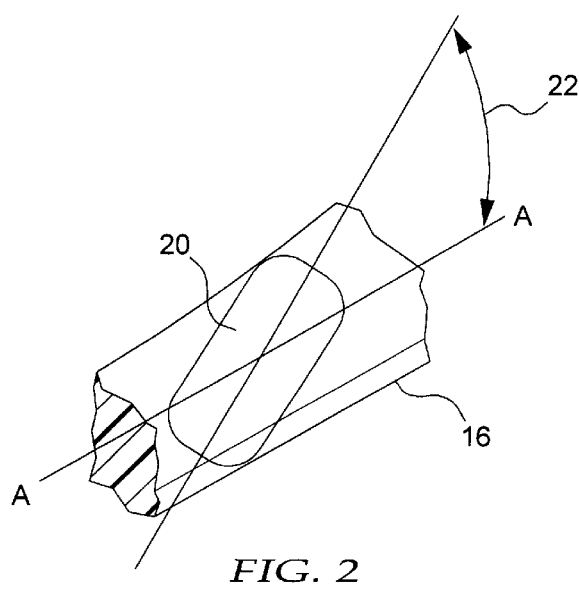
FIG. 2 is an enlargement of a segment of FIG. 1, showing the detail of the scarf joint between the toothbrush head and handle; wherein, the scarf joint is at an angle of about 30 degrees with respect to the longitudinal axis, A—A.

Referring now to FIG. 1, a perspective view of a toothbrush 10, manufactured by the method of the present invention having a longitudinal axis A—A, wherein the toothbrush has a head 14, which extends from a neck 16, which neck extends from a handle 18. In accordance with the present invention the head 14, is joined to the handle 18, by at a joint 20, herein referred to as a scarf joint, which joint is located within the neck 16. As shown in FIG. 2, an enlargement of the neck 16, portion of FIG. 1, the scarf joint 20, is formed by mating chamfered or cutaway ends, one end from the head 14, portion and one from the handle 18, portion. The chamfer or scarf angle 22, is 15 to 70 degrees in relation to the toothbrush longitudinal axis, A—A. Preferably the scarf angle is 15 to 30 degrees, in order to maximize the surface area of the scarf joint 20, to increase the resulting weld surface area to provide increased joint strength and to reduce stress concentrations transverse to the longitudinal axis, which may adversely effect the desired flexibility of the toothbrush neck 16.

A flat bristle tuft pattern 24, is shown extending from the head 14; however, the present invention is not limited to any particular bristle tuft pattern. Further, while the bristles themselves may be inserted into the head 14, prior to joining the head 14, to the handle 18; it is preferred to insert the bristles subsequent to the joining of the heads to the handles to facilitate the easy manipulation, positioning and holding of the head 14, in the intimate abutting position with the handle 18, during the laser welding process.

The present invention comprises pre-forming the toothbrush thermoplastic head 14, and handle 18, components, one component being free of any material, such as a pigment or dye, capable of absorbing from about 0.7 to about 2.0 micrometers within near-IR, or from about 4.0 to about 6.0 micrometers within the IR wavelength laser energy. The components are bonded together by positioning the scarf joint surfaces 20, to be bonded together in a secure, intimate, abutting relationship using conventional means and then exposing the joint to a laser beam through the component which is free of any such laser absorbing material, for about 1 second or less; the laser beam having a wavelength within from about 0.7 to about 2.0 micrometers, or from about 4.0 to about 6.0 micrometers. Further, the power of the laser beam should be about 50 to about 400 watts, preferably from about 90 to about 250 watts, and most preferably from about 95 to 120 watts. The power of the laser beam is preferably delivered in a series of short pulses, from about 0.5 to 1.5 milliseconds in duration, at a frequency of from about 50 to about 150 pulses per second (Hz). The energy contained within each pulse may be from about 0.5 to about 3 joules and may be varied with the particular thermoplastic being bonded; for example, when bonding polypropylene, it is preferred to use a pulse of about 1 millisecond, at about 100 Hz. Further, the power within each pulse can be varied inversely to the exposure time of the weld surfaces thereto, within the limits defined herein; to minimize the weld time interval, while avoiding excessive power which will degrade the thermoplastic being welded and which may cause excessive softening of the joint, which in turn may cause consumer unacceptable flash.

It is preferred to operate the laser in a fixed, static welding mode, as opposed to a scanning mode across the weld area; to produce consistent heating, reduce production time and to simplify the overall production system. Accordingly, the laser beam should preferably cover the entire weld zone, which for a typical toothbrush neck of about 5 mm in diameter is less than 1 $cm^2$ in area, considering the increased area due to the angle of the scarf joining.

As discussed above, it has been found that particular lasers, having wavelenghts from about 0.7 to about 2.0 micrometers within the near-IR, or wavelengths from about 4.0 to about 6.0 micrometers within the IR, penetrate typical thermoplastic toothbrush material without significant absorption or heating thereof. Such wavelength laser beams will be absorbed within any from about 0.7 to about 2.0 micrometers, or from about 4.0 to about 6.0 micrometers wavelength absorbing material contained within the toothbrush thermoplastic, including conventional pigments and dyes, especially black. Lasers emitting such a near-IR wavelength laser beam, useful in this invention, include solid-state neodymium-doped yttrium aluminum garnet lasers (hereinafter YAG lasers), erbium-glass and semiconductor aluminum gallium arsenide diode lasers (hereinafter diode lasers). Lasers emitting such an IR wavelength beam, useful in this invention, include carbon monoxide (CO) lasers which emit at about 5 to about 6 micrometers in wavelength.

Particularly useful lasers in the present invention are YAG lasers have a wavelength of about 1.06 micrometers and diode lasers having a wavelength range of from about 0.8 to about 0.95 micrometers. Such diode lasers are available from Hughes Danbury Optical Systems, Danbury, Conn. 10810-7589 or from Industrial Microphotonics, St. Charles, Mo. 63301. Such YAG lasers are available from Lumonics Corporation, Industrial Products Division, Livonia, Mich. 48152-1016, under the trade designation JK700.

Excimer lasers, with wavelengths just below the near-IR range, from about 0.193 to about 0.351 micrometers, are not recommended for use in the present invention due to the fact that they tend to cross-link thermopolymers and increase the brittleness thereof. Such cross-linking degradation will cause increased resistance to deformation, impacting the ability to the toothbrush to yield during brushing and may result in the toothbrush breaking during use.

Typical thermoplastic materials of toothbrush construction useful in the present invention, that transmit laser energy having wavelengths from about 0.7 to about 2.0 micrometers and/or from about 4.0 to about 6.0 micrometers, without absorbing any significant amount thereof; include, generally rigid thermoplastics with a flexural modulus of about 100,000 to about 350,000 psi, containing no foreign materal which absorbs such wavelength energy.

Preferably the toothbrush head 14, is molded from a variety of less rigid thermoplastic materials, having a flexural modulus of from about 100,000 to about 200,000 psi, to reduce the gingival trauma associated with excessive brushing pressure by the user. A preferred less rigid polypropylene is available from Huntsman Corporation, Longview, Tex., 75603 under the trade-designation P5M5K-047, with a flexural modulus of about 170,000 psi. Other less rigid, more flexible, materials useful for the toothbrush head 14, include thermoplastic elastomers (TPE), thermoplastic urethane (TPU), and ethylene vinyl acetate (EVA). A preferred substantially clear TPE is available from Teknor Apex Company, Pawtucket, R.I. 02861, sold under the trade designation of 96-E0807A-03NT WAT CLR.

Preferably the toothbrush handle 18, can be molded of a variety of flexibly resilient materials more rigid than that selected for the toothbrush head 14. A suitable polypropylene, with a flexural modulus of 216,000 psi by ASTM test method D790, is available from Huntsman Corporation, Longview, Tex., 75603 under the trade-designation Huntsman Polypropylene P4G3Z-039. Another suitable polypropylene is available from Amoco Polymers, Inc., Alpharetta, Ga. 30202-3914, sold under the trade designation 7635 with a flexural modulus of about 275,000 psi. A toothbrush handle of such a 216,000 to 275,000 psi material will provide enhanced rigidity to allow the user to better control and manipulate the position of the toothbrush head during brushing.

Alternative "transparent" thermoplastics useful in either the head 14, or handle 18, include clear polyester, such as polyethylene terephthalate or a copolyester, such as polycyclohexylene dimethylene terephthalate, acid modified, polyester (PCTA) or styrene aciylonitrile (SAN), acrylonitrile butadiene styrene (ABS), polymethyl methacrylate (PMMA) or a cellulosic plastic, such as cellulose acetate propionate (CAP). Such "transparent" thermoplastics, that transmit such wavelength laser energy, are clear or natural in color, or may contain a pigment or dye also "transparent" to such wavelengths, such as pink, green and translucent red.

In an alternative embodiment of the present invention, as mentioned above, the pre-formed thermoplastic toothbrush head 14, and handle 18, components being joined, are both free of any material capable of absorbing from about 0.7 to about 2.0 micrometers, or from about 4.0 to about 6.0 micrometers wavelength laser energy; however, a layer or coating of material capable of absorbing such wavelength laser energy is spread on one of the of the components across the scarf joint 20; such that, the from about 0.7 to about 2.0 micrometers wavelength, or from about 4.0 to about 6.0 micrometers wavelength laser beam will penetrate the thermoplastic and be absorbed by the coating layer, raising the temperature of the coating layer and by conduction and radiation heating the abutting surfaces of the scarf joint 20, to melting, to form a weld. It has been found that smoothing the abutting surfaces of the scarf joint 20, such as with very fine sand paper, i.e. 1200 grit, before applying the laser absorbing coating will provide joints with a cleaner appearance. Further, it has been found that the amount of laser absorbing material which forms the coating is surprisingly small, on the order of about 0.5 to about 3.0 micrograms and preferably about 1.5 to about 2.0 micrograms of carbon black, which may preferably be suspended in a solvent, such as methanol or ethyl acetate. Such a small amount of carbon black will not be readily consumer apparent after the welding process is complete. A particular carbon black found to be useful in the present invention is available from Plasticolors of Ashtabula, Ohio 44005, under the trade-designation Arilux New Moon Black.

In the method of the present invention, it is preferable to securely hold the surfaces of the scarf joint 20, in alignment and in intimate contact by using a fixture to maintain the head 14, and handle 18, together throughout the bonding process. Such a fixture preferably has at least one exposed side manufactured of a material "transparent" to from about 0.7 to about 2.0 micrometers, or from about 4.0 to about 6.0 micrometers wavelength energy, such as PFA Teflon; such that, the toothbrush components can be firmly secured on all sides during the bonding process, while the laser beam passes into the toothbrush components with minimal loss of energy through the exposed "transparent" side. The pressure applied by the fixture to align and maintain the surfaces of the scarf joint 20, in intimate contact can range from about 40 to about 70 kPa.

In order to lower the time interval to weld the toothbrush head 14, to handle 18, and obtain better control of the process; the fixture securing the head 14, and handle 18, can be heated during the laser bonding process of the present invention. This heating helps provide a smooth surface finish about the scarf joint 20, i.e. minimizing any flash thereabout. To facilitate this heating, the fixture other than the one side "transparent" to from about 0.7 to about 2.0 micrometers or from about 4.0 to about 6.0 micrometers wavelength laser energy, can be machined of metal to easily conduct heat while providing dimensional stability. Preferably the metal is steel, which can be heated by conventional electrical heating means. Depending upon the particular thermoplastic materials of the toothbrush head 14, and handle 18, being bonded together; the temperature of the fixture can be from about room temperature to about 95 degrees Celsius. For polypropylene toothbrush heads and handles a temperature of about 85 to about 95 degrees Celsius is preferred; while for polyester heads and handles the temperature range is preferably from room temperature to 60 degrees Celsius, depending upon the particular polyester.

The toothbrush head 14, and handle 18, components of the present invention can be pre-formed by conventional injection molding technology, which technology is well known in the art. For example, in accordance with the present invention, the head 14, and handle 18, can each be injection molded in a single step.

The toothbrush bristles may be implanted in the toothbrush head 14, either before or after joining the heads to the handles using either typical staple technology or using more modem non-staple technology as disclosed in U.S. Pat. Nos. 4,635,313, 4,637,660, 4,954,305, 5,045,267, 5,609,890, 5,390,984, 5,533791, and 5,823,633. Such non-staple technology involves processes wherein the bristle tufts 24, are fused into the toothbrush head 14, by heating both the bristle tufts 24, and the toothbrush head 14, which are then brought together in a fusion process; or, wherein the ends of the bristle tufts 24, are pre-positioned in the injection mold prior to the introduction of the toothbrush material, which toothbrush material is subsequently injected about the ends of the bristle tufts 24, locking the bristle tufts 24, in place in the toothbrush head 14, in another non-staple process.

What is claimed is:

1. A method of welding a pre-formed thermoplastic toothbrush head and a preformed thermoplastic toothbrush handle comprising, (a) selecting a toothbrush head which is free of any material capable of absorbing from about 0.7 to about 2.0 micrometers, or from about 4.0 to about 6.0 micrometers wavelength energy; (b) selecting a toothbrush handle containing from about 0.7 to about 2.0 micrometers, or about 4.0 to about 6.0 micrometers wavelength energy absorbing material; (c) aligning the respective end surfaces of the head and handle to closely contact each other to form a joint; (d) exposing the joint to from about 0.7 to about 2.0 micrometers, or from about 4.0 to about 6.0 micrometers wavelength energy laser beam, which laser beam is capable of penetrating the toothbrush head and contacting the joint; whereby, the energy of the laser beam is absorbed at the surface of the toothbrush handle at the joint by the energy absorbing material therein, causing the toothbrush head and handle surfaces about the joint to melt and fuse together.

2. A method of welding a preformed thermoplastic toothbrush head and a pre-formed thermoplastic toothbrush handle comprising, (a) selecting a toothbrush handle which is free of any material capable of absorbing from about 0.7 to about 2.0 micrometers, or from about 4.0 to about 6.0 micrometers wavelength energy; (b) selecting a toothbrush head containing from about 0.7 to about 2.0 micrometers, or from about 4.0 to about 6.0 micrometers wavelength energy absorbing material; (c) aligning the respective end surfaces of the head and handle to closely contact each other to form a joint; (d) exposing the joint to from about 0.7 to about 2.0 micrometers, or from about 4.0 to about 6.0 micrometers wavelength laser beam, which laser beam is capable of penetrating the toothbrush handle and contacting the joint; whereby, the energy of the laser beam is absorbed at the surface of the toothbrush head at the joint by the energy absorbing material therein, causing the toothbrush head and handle surfaces about the joint to melt and fuse together.

3. A method of welding a pre-formed thermoplastic toothbrush head and preformed thermoplastic toothbrush handle comprising, (a) selecting both a toothbrush head and handle that are both free of any material capable of absorbing from about 0.7 to about 2.0 micrometers, or from about 4.0 to about 6.0 micrometers wavelength energy; (b) layering a coating of from about 0.7 to about 2.0 micrometers, or from about 4.0 to about 6.0 micrometers wavelength energy absorbing material on one of the respective end surfaces of the head or handle to be joined, (c) aligning the respective end surfaces of the head and handle to closely contact each other forming a joint; (d) exposing the joint to from about 0.7 to about 2.0 micrometers, or about 4.0 to about 6.0 micrometers wavelength laser beam, which laser beam is capable of penetrating the head or handle to contact the coating; (e) whereby the energy of the laser beam is absorbed by the energy absorbing material in the coating, causing the head and handle surfaces about the joint to melt and fuse together.

4. The method of claim 3, wherein the joint formed between the pre-formed head and handle is smoothed before applying the coating.

5. The method of claim 3, wherein quantity of energy absorbing material in the coating is from about 0.5 to about 3.0 micrograms.

6. The method of claim 3, wherein the energy absorbing material in the coating is suspended in a solvent.

7. The method as in any of claims 1, 2, or 3, wherein the joint formed between the head and handle is chamfered to a scarf angle of 70 degrees to 15 degrees relative to the longitudinal axis of the toothbrush.

8. The method as in any of claims 1, 2, or 3, wherein the joint formed between the head and handle is chamfered to a scarf angle of 30 degrees to 15 degrees relative to the longitudinal axis of the toothbrush.

9. The method as in any of claims 1, 2, or 3, wherein the output power of the laser beam is from about 50 to about 400 watts.

10. The method as in any of claims 1, 2, or 3, wherein the output power of the laser beam is from about 90 to about 250 watts.

11. The method as in any of claims 1, 2, or 3, wherein the output power of the laser beam is from about 95 to about 120 watts.

12. The method as in any of claims 1, 2, or 3, wherein laser beam is operated in a static weld mode covering the entire area of the joint being welded.

13. The method as in any of claims 1, 2, or 3, wherein the laser is a neodynium-doped yttrium aluminum garnet laser.

14. The method as in any of claims 1, 2, or 3, wherein the laser is a semiconductor aluminum gallium arsenide diode laser.

15. The method as in any of claims 1, 2, or 3, wherein the laser is a CO laser.

16. The method as in any of claims 1, 2, or 3, wherein the energy absorbing material is a pigment or a dye.

17. The method as in claim 16, wherein the energy absorbing material is carbon black.

18. The method as in any of claims 1, 2, or 3, wherein the head and handle being bonded together are held in a heated fixture.

19. The method as in claim 18, wherein the heated fixture is heated to a temperature of from about room temperature to about 95 degrees Celsius.

20. The method as in any of claims 1, 2, or 3, wherein the head and handle are of different materials, which different materials have different flexural modulus.

21. The method as in claim 20, wherein the flexural modulus of the head is from about 100,000 to about 200,000 psi and the flexural modulus of the handle is from about 200,000 to about 350,000 psi.

22. The method as in any of claims 1, 2, or 3, wherein the head and handle are of different colors.

* * * * *